United States Patent
Liao et al.

(10) Patent No.: US 10,332,005 B1
(45) Date of Patent: **\*Jun. 25, 2019**

(54) SYSTEM AND METHOD FOR EXTRACTING SIGNATURES FROM CONTROLLED EXECUTION OF APPLICATIONS AND USING THEM ON TRAFFIC TRACES

(71) Applicant: Narus, Inc., Sunnyvale, CA (US)

(72) Inventors: Yong Liao, Sunnyvale, CA (US); Mario Baldi, Cuneo (IT); Stanislav Miskovic, San Jose, CA (US); Antonio Nucci, San Jose, CA (US); Qiang Xu, Hangzhou (CN)

(73) Assignee: Narus, Inc., Sunnyvale, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 13/626,070

(22) Filed: Sep. 25, 2012

(51) Int. Cl.
*G06N 5/00* (2006.01)
*G06N 99/00* (2019.01)

(52) U.S. Cl.
CPC .............. *G06N 5/00* (2013.01); *G06N 99/00* (2013.01)

(58) Field of Classification Search
None
See application file for complete search history.

(56) References Cited

U.S. PATENT DOCUMENTS

| | | | |
|---|---|---|---|
| 6,343,287 B1 * | 1/2002 | Kumar et al. | |
| 7,503,071 B1 * | 3/2009 | Hernacki | 726/23 |
| 8,577,817 B1 * | 11/2013 | Keralapura et al. | 706/13 |
| 2003/0014525 A1 * | 1/2003 | DeLima | H04L 67/322 709/227 |
| 2003/0229695 A1 * | 12/2003 | McBride | 709/224 |
| 2004/0210877 A1 * | 10/2004 | Sluiman et al. | 717/130 |
| 2006/0085681 A1 * | 4/2006 | Feldstein | G06F 11/3684 714/25 |
| 2007/0006183 A1 * | 1/2007 | Mensch et al. | 717/136 |
| 2007/0288886 A1 * | 12/2007 | Mensch et al. | 717/104 |
| 2008/0028468 A1 * | 1/2008 | Yi et al. | 726/23 |
| 2008/0034350 A1 * | 2/2008 | Conti | 717/124 |
| 2008/0134331 A1 * | 6/2008 | Sung Won et al. | 726/22 |
| 2008/0305815 A1 * | 12/2008 | McDonough | 455/466 |
| 2008/0320147 A1 * | 12/2008 | DeLima | H04L 67/322 709/227 |
| 2009/0077329 A1 * | 3/2009 | Wood et al. | 711/156 |

(Continued)

OTHER PUBLICATIONS

Park et al, "Towards Automated Application Signature Generation for Traffic Identification", Published in: Network Operations and Management Symposium, 200S. NOMS 2008, IEEE, Date of Conference: Apr. 7-11, 2008, pp. 160-167.*

(Continued)

*Primary Examiner* — Dave Misir
(74) *Attorney, Agent, or Firm* — Kwan & Olynick LLP (57) ABSTRACT

Embodiments of the invention provide a method, system, and computer readable medium for classifying network traffic based on application signatures generated during a training phase. The application signatures are generated based on tokens extracted from a training set that is generated by a particular application during the training phase. Accordingly, a new token extracted in real-time from current network data is compared to the application signatures to determine if the current network data is generated by the particular application.

42 Claims, 4 Drawing Sheets

(56) References Cited

U.S. PATENT DOCUMENTS

| | | | |
|---|---|---|---|
| 2009/0199297 A1* | 8/2009 | Jarrett et al. | 726/24 |
| 2010/0088670 A1* | 4/2010 | Paster | 717/106 |
| 2010/0318971 A1* | 12/2010 | Nagle | G06F 11/3672 717/125 |
| 2011/0040706 A1* | 2/2011 | Sen et al. | 706/12 |
| 2011/0161486 A1* | 6/2011 | Podjarny | G06F 11/3676 709/224 |
| 2011/0173490 A1* | 7/2011 | Narayanaswamy et al. | 714/4.11 |
| 2011/0277033 A1* | 11/2011 | Ramchetty et al. | 726/24 |
| 2012/0174075 A1* | 7/2012 | Carteri | G06F 11/3688 717/127 |
| 2012/0198351 A1* | 8/2012 | Lee | G06F 17/30861 715/744 |
| 2012/0304244 A1* | 11/2012 | Xie et al. | 726/1 |
| 2012/0317306 A1* | 12/2012 | Radinsky et al. | 709/235 |
| 2012/0331556 A1* | 12/2012 | Alperovitch et al. | 726/23 |

OTHER PUBLICATIONS

Ye et al, "AutoSig-Automatically Generating Signatures for Applications", Published in: IEEE Ninth International Conference on Computer and Information Technology, Date of Conference: Oct. 11-14, 2009, pp. 104-109.*

* cited by examiner

FIG. 3

SYSTEM AND METHOD FOR EXTRACTING SIGNATURES FROM CONTROLLED EXECUTION OF APPLICATIONS AND USING THEM ON TRAFFIC TRACES

CROSS REFERENCE TO RELATED APPLICATIONS

This application is related to U.S. patent application Ser. No. 13/109,675 filed May 17, 2011 and entitled "SYSTEM AND METHOD FOR USING NETWORK APPLICATION SIGNATURES BASED ON MODIFIED TERM TRANSITION STATE MACHINE," which is incorporated herein by reference.

BACKGROUND OF THE INVENTION

Identifying the flows generated by different application-layer protocols is of major interest for network operators. Such identification enables QoS (quality of service) engineering for different types of traffic, such as voice and video traffic, and enables specific applications such as traffic forensics applications, network security applications, etc. Moreover, it enables ISPs to control applications with a potential to use large amounts of resources, such as peer-to-peer (P2P) applications, to limit and/or control application traffic and usage. For enterprise networks, it is very important for administrators to know activities on their network, such as services that users are running, the applications dominating network traffic, etc.

Throughout this disclosure, the term "flow" refers to a sequence of packets exchanged between two network nodes, referred to as a source and a destination of the flow where the source or the destination may be the originator of the exchange. Generally, in an IP network, such as the Internet, a flow is identified by a 5-tuple of <source IP address, destination IP address, source port, destination port, protocol> where the payload of the flow may be represented by a string of alphanumeric characters and other sequences of bits.

SUMMARY

In general, in one aspect, the invention relates to a method for classifying network traffic in a network. The method includes (a) generating, by a processor of a computer system during a training phase, a signature set of an application executing in the network, and (b) classifying, by the processor during a classifying phase, a new flow or set of flows obtained from the network traffic based on the signature set. Generating the signature set in the training phase comprises (i) obtaining, from the network traffic, a training set having a plurality of flows generated by the application, (ii) extracting, based on a pre-determined extraction criterion, one or more tokens from one or more flows of the plurality of flows, wherein a vector element of each token represents a portion of the flow, (iii) computing a persistence measure of each token representing a tally of flows where the token is found in the training set, and (iv) identifying, in response to the persistence measure exceeding a pre-determined threshold, one or more tokens as a signature of the application, wherein the signature is included in a plurality of signatures forming the signature set of the application. Classifying the new flow or set of flows during the classifying phase comprises (i) generating a comparison result by comparing the new flow to the signature set of the application, and (ii) classifying, in response to the comparison result meeting a pre-determined classifying criterion, the new flow as being generated by the application.

In general, in one aspect, the invention relates to a system for classifying network traffic in a network. The system includes (a) a hardware processor, (b) an acquisition module executing on the hardware processor and configured to obtain, during a training phase from the network traffic, a training set comprising a plurality of flows generated by the application, (c) a token extractor executing on the hardware processor and configured to extract, during the training phase and based on a pre-determined extraction criterion, a token from a flow of the plurality of flows, wherein a vector element of the token represents a portion of the flow, (d) a signature generator executing on the hardware processor and configured to generate, during the training phase, a plurality of signatures of an application executing in the network by (i) computing a persistence measure of the token representing a tally of flows where the token is found in the training set, and (ii) identifying, in response to the persistence measure exceeding a pre-determined threshold, the token as a signature of the application, wherein the signature is included in a plurality of signatures forming the signature set of the application, and (e) a classifier executing on the hardware processor and configured to classify, during a classifying phase, a new flow obtained from the network traffic based on the signature set by (i) generating a comparison result by comparing the new flow to the signature set of the application, and (ii) classifying, in response to the comparison result meeting a pre-determined classifying criterion, the new flow as being generated by the application.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Embodiments of the invention provide a method, system, and computer readable medium for network traffic classification that can be applied to application/traffic profiling. Specifically, for each incoming flow observed on a network, a classifier attempts to map the flow to the application from which the flow is generated. Further, the method and system disclosed in the present disclosure can be applied also to application profiling, namely associating specific traffic flows to specific states the application traverses during its execution, and vice versa.

Generally, the term "flow" may refer to a unidirectional flow or a bi-directional flow. A unidirectional flow includes only data packets traveling in one direction, either from server node to client node or vice versa. A bi-directional flow includes data packets traveling in both directions from server node to client node, and vice versa. The originator of the flow may be the server node or the client node. A bi-directional flow includes a combination of two unidirectional flows traveling in opposite directions. In one or more embodiments, a bi-directional flow is classified by classifying the two unidirectional flows separately. Classifying the network traffic based on unidirectional flows provides a solution to the routing asymmetry at the Internet backbone, where one direction of a flow is often missing. Using unidirectional flows allows the classifier to be deployed anywhere in the network.

Figure 1:
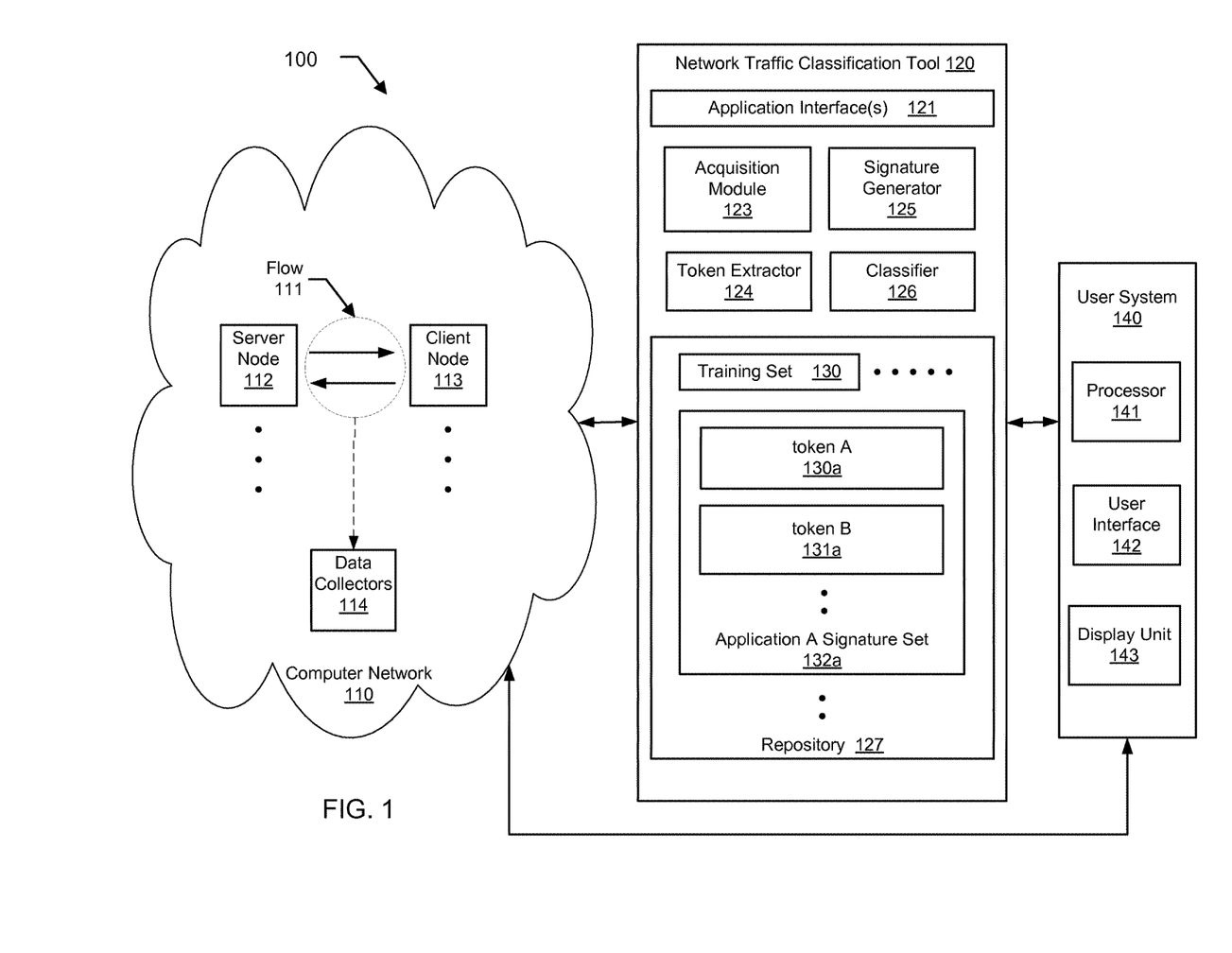
FIG. 1 shows a system block diagram according to aspects of the invention.

FIG. 1 shows a diagram of a system (100) for network traffic classification and application/traffic profiling in accordance with one or more embodiments. In one or more embodiments of the invention, one or more of the components shown in FIG. 1 may be omitted, repeated, and/or partitioned in a different manner. Accordingly, embodiments of the invention should not be considered limited to the specific arrangements of components shown in FIG. 1.

As shown in FIG. 1, the system (100) includes a network traffic classification tool (120), a user system (140), and a computer network (110). The network traffic classification tool (120) includes data repository (127), one or more application interfaces (121), acquisition module (123), token extractor (124), signature generator (125), and classifier (126). The user system (140) includes a processor (141), a user interface (142), and a display unit (143). The computer network (110) may include wired and/or wireless portions of the Internet and/or other data communications networks such as wide area networks (WANs), local area networks (LANs), etc. In one or more embodiments, the computer network (110) is a communications network. For example, the computer network (110) may also include one or more of cellular communications network, satellite communications network, or other mobile communications network.

Further, the computer network (110) includes network nodes (e.g., server node (112), client node (113), data collectors (114), etc.), which are the devices configured with computing and communication capabilities for executing applications in the network (110). As shown in FIG. 1, the server node (112) and client node (113) communicate with each other by exchanging data packets forming a flow (111), which includes two unidirectional flows represented by two arrows. Although shown as a bi-directional flow in the example depicted in FIG. 1, the flow (111) may also be a single unidirectional flow in other examples. In one or more embodiments, the server node (112) and the client node (113) exchange data packets in the flow (111) as a result of an application executing on the server node (112) and the client node (113). In this context, the flow (111) is referred to as being generated by the application executing on the server node (112) and client node (113). In one or more embodiments, the client node (113) may be a mobile device, such as a smartphone, a tablet computer, a hand held gaming device, etc. In such embodiments, the application is referred to as a mobile application mobile app, or app. In one or more embodiments, certain device(s) (e.g., data collectors (114)) within the computer network (110) may be configured to collect network data (e.g., flow (111)) for providing to the network traffic classification tool (120). Each of these components is described below. One of ordinary skill in the art will appreciate that embodiments are not limited to the configuration shown in FIG. 1.

In one or more embodiments of the invention, the network traffic classification tool (120) is configured to interact with the computer network (110) using one or more of the application interface(s) (121). The application interface (121) may be configured to receive data (e.g., flow (111)) from the computer network (110) and/or store received data to the data repository (127). Such network data captured over a time period (e.g., an hour, a day, a week, etc.) is referred to as a trace or network trace. Network trace contains network traffic data related to communications between nodes in the computer network (110). For example, the network trace may be captured on a routine basis using the data collectors (114) and selectively sent to the application interface (121) to be formatted and stored in the repository (127) for analysis. For example, the data collectors (114) may be a packet analyzer, network analyzer, protocol analyzer, sniffer, netflow device, semantic traffic analyzer (STA), or other types of data collection devices that intercept and log data traffic passing over the computer network (110) or a portion thereof. In one or more embodiments, the data collectors (114) may be deployed in the computer network (110) by a network communication service provider (e.g., ISP), a network security service provider, a cellular service provider (CSP) or other business or government entities. The data collector (114) may be configured to capture and provide network trace to the application interface (121) through an automated process, such as through a direct feed or some other form of automated process. Such network data may be captured and provided on a periodic basis (e.g., hourly, daily, weekly, etc.) or based on a trigger. For example, the trigger may be activated automatically in response to an event in the computer network (110) or activated manually through the user system (140). In one or more embodiments, the data collectors (114) are configured and/or activated by the network traffic classification tool (120).

In one or more embodiments, the user system (140) is configured to interact with a user using the user interface (142). The user interface (142) may be configured to receive data and/or instruction(s) from the user. The user interface (142) may also be configured to deliver information (e.g., a report or an alert) to the user. In addition, the user interface (142) may be configured to send data and/or instruction(s) to, and receive data and/or information from, the network traffic classification tool (120). The user may include, but is not limited to, an individual, a group, an organization, or some other entity having authority and/or responsibility to access the network traffic classification tool (120). Specifically, the context of the term "user" here is distinct from that of a user of the computer network (110) or a user of the application executing on the sever node (112) and the client node (113). The user system (140) may be, or may contain a form of, an internet-based communication device that is capable of communicating with the application interface (121) of the network traffic classification tool (120). Alternatively, the network traffic classification tool (120) may be part of the user system (140). The user system (140) may correspond to, but is not limited to, a workstation, a desktop computer, a laptop computer, or other user computing device.

In one or more embodiments, the processor (i.e., central processing unit (CPU)) (141) of the user system (140) is configured to execute instructions to operate the components of the user system (140) (e.g., the user interface (142) and the display unit (143)).

In one or more embodiments, the user system (140) may include a display unit (143). The display unit (143) may be a two dimensional (2D) or a three dimensional (3D) display configured to display information regarding the computer network (e.g., browsing the network traffic data) or to display intermediate and/or final results of the network traffic classification tool (120) (e.g., report, alert, etc.), including intermediate and/or final results of the signature set selection process.

As shown, communication links are provided between the network traffic classification tool (120), the computer network (110), and the user system (140). A variety of links may be provided to facilitate the flow of data through the system (100). For example, the communication links may provide for continuous, intermittent, one-way, two-way, and/or selective communication throughout the system (100). The communication links may be of any type, including but not limited to wired, wireless, and a sequence of links separated by intermediate systems routing data units. In one or more embodiments, the network traffic classification tool (120), the user system (140), and the communication links may be part of the computer network (110).

In one or more embodiments, a central processing unit (CPU, not shown) of the network traffic classification tool (120) is configured (e.g., programmed) to execute instructions to operate the components of the network traffic classification tool (120). In one or more embodiments, the memory (not shown) of the network traffic classification tool (120) is configured to store software instructions for analyzing the network trace to extract tokens, generating classification signatures, and classifying new flows captured from the network traffic to identify the application(s) that generates the new flows. The memory may be one of a variety of memory devices, including but not limited to random access memory (RAM), read-only memory (ROM), cache memory, and flash memory. The memory may be further configured to serve as back-up storage for information stored in the data repository (127).

The network traffic classification tool (120) may include one or more system computers, which may be implemented as a server or any conventional computing system having a hardware processor. However, those skilled in the art will appreciate that implementations of various technologies described herein may be practiced in other computer system configurations known to those skilled in the art.

In one or more embodiments, the network traffic classification tool (120) is configured to obtain and store data in the data repository (127). In one or more embodiments, the data repository (127) is a persistent storage device (or set of devices) and is configured to receive data from the computer network (110) using the application interface (121). The data repository (127) is also configured to deliver working data to, and receive working data from, the acquisition module (123), token extractor (124), signature generator (125), and classifier (126). The data repository (127) may be a data store (e.g., a database, a file system, one or more data structures configured in a memory, some other medium for storing data, or any suitable combination thereof), which may include information (e.g., training set (130), application A signature set (132a), etc.) related to the network traffic classification. The data repository (127) may be a device internal to the network traffic classification tool (120). Alternatively, the data repository (127) may be an external storage device operatively connected to the network traffic classification tool (120).

In one or more embodiments, the network traffic classification tool (120) is configured to interact with the user system (140) using the application interface (121). The application interface (121) may be configured to receive data and/or instruction(s) from the user system (140). The application interface (121) may also be configured to deliver information and/or instruction(s) to the user system (140). In one or more embodiments, the network traffic classification tool (120) is configured to support various data formats provided by the user system (140).

In one or more embodiments, the network traffic classification tool (120) includes the acquisition module (123) that is configured to obtain a network trace from the computer network (110), for example via data collectors (114). In one or more embodiments, the acquisition module (123) works in conjunction with the data collectors (114) to parse data packets and collate data packets belonging to the same flow tuple (i.e., the aforementioned 5-tuple) for flow reconstruction and for accumulating multiple flows to form the network trace. For example, such network trace, or information extracted therefrom, may then be stored in the repository (127) as training set (130), etc.

In one or more embodiments, a flow parser (e.g., acquisition module (123) in conjunction with data collectors (114) in FIG. 1) reconstructs (e.g., eliminates redundant packets, collates packets into a correct sequence, etc.) all the packets that correspond to the same traffic flow identified by the aforementioned 5-tuple. In one or more embodiments, the flows are captured and parsed throughout a pre-configured time interval recurring on a periodic basis (e.g., every minute, hourly, daily, etc.) or triggered in response to an event.

In one or more embodiments of the invention, the network traffic classification tool (120) includes the token extractor (124) that is configured to extract, from each flow (e.g., flow (111)) captured from the network traffic data, one or more extracted portion(s) to form a token. In one or more embodiments, an extracted portion comprises a pre-determined portion of the flow, such as the host name or domain name. In one or more embodiments, the token comprises a number of extracted portions of the flow where the extracted portions are arranged in a sequence. For example, an extracted portion may be a substring where the flow is represented by a character string. In this example, the extracted portions may be extracted based on pre-determined delimiters (i.e., separators), such as "&", "/", "=", "?", "#", EOL, etc. A particular type of extracted portion is a Key-Value (K-V) pair that is included in the flow. An example K-V pair may have the key as a host name or a domain name, while the value is a substring delimited by {"?", "#", EOL}. In one or more embodiments, a token is a sequence of K-V pairs. In one or more embodiments, the K-V pairs are found in the query part of an HTTP URL. In one or more embodiments, the K-V pairs are also found in at least one of the headers and the body of an HTTP message, e.g., in a JSON dictionary, an XML formatted document, a JAVA® dictionary, etc. known to those skilled in the art. In general, K-V pairs include following categories: web-object-dependent K-V pairs, run-dependent K-V pairs, application-dependent K-V pairs, developer-dependent K-V pairs, and platform-dependent K-V pairs.

In one or more embodiments, types (e.g., host name, K-V pair, extracted portions delimited by a pre-determined set of delimiters) of tokens extracted from the token extractor (124) are the same for each flow (e.g., flow (111)) processed by the token extractor (124) for token extraction. Specifically, the token extractor (124) uses the same pre-defined token types to process flows generated from different applications. Generally, different types of tokens may be effective for classifying different types of applications and different states an application may be in. Further, an application may be effectively classified using multiple types of tokens. In one or more embodiments, multiple types of tokens are used. Some tokens may each contain a fixed number of extracted portion(s), other tokens may each contain a variable number of extracted portion(s).

Generally, data mining the query fields inside URIs is difficult. First, it is difficult to reverse engineer the underlying logic of these URIs as there are millions of applications and host domains. Second, without ground truth, the information reflected from URIs can be misleading and confusing. For example, a key of "id=xxx" in query field may refer to run id, request id, application id, web object id, developer id, etc. In one or more embodiments, as described below, a statistical approach is used to generate application signature based on K-V pairs.

In one or more embodiments of the invention, the network traffic classification tool (120) includes the signature generator (125) that is configured to generate a signature set for an application executing in the network (110). An example signature set is shown in FIG. 1 as the application A signature set (132a). In one or more embodiments, the application A signature set (132a) is further divided into signature subsets (not shown) wherein each signature subset corresponds to a state the application A can traverse during its execution. Consequently, the signature subset corresponding to state A.X can be used to identify the flows that application A generates while in that state A.X, which also enables to determine that application A is in state A.X when observing flows identified by the signature subset. In one or more embodiments, the application A signature set (132a) is generated in a training phase (also referred to as a regression phase) containing one or more training sessions where a set of representative flows is captured from the application A (not shown) during each training session. Each set of representative flows is referred to as a training set. For example, the application A signature set (132a) may be generated from multiple training sets (e.g., training set (130), etc.) each including a set of representative flows generated by the application A (not shown) during one training session.

In one or more embodiments, flows (not shown) captured from the network (110) may be screened to only include those being generated by the application A (not shown) in the training set (130). In one or more embodiments, such screening may be performed by limiting the captured flows to the client node (113) that is dedicated as a testing device for the application A (not shown). In one or more embodiments, the client node (113) includes a mobile device or a mobile device emulator that is configured to execute the application A (not shown) by an automated tester. In one or more embodiments, the automated tester is a "clicking tool" that exercises (clicks) the various buttons/icons available in the user interface of the installed application according to a test sequence (i.e., a test suite). This is for activating execution patterns of the application. In one or more embodiments, the clicking (i.e., test sequence) follows a pattern that may be random, pre-recorded, or programmed, i.e., based on policies related to the screens, icons, buttons, and menus displayed as a result of the clicking. In one or more embodiments, multiple training sets are formed by varying the clicking sequence, the operating system running on the mobile device, the application version or other system and environmental parameter that may affect the traffic generated by the application. In another embodiment, the clicking tool is generating events of several different types, including but not limited to clicks, that can be accepted by the application. In another embodiment, the clicking is performed manually by a human tester or in combination with the actions of a clicking tool. In one or more embodiments, the flows generated in given states of the execution of the application can be singled out to partition the training set in portions associated to specific execution states to later partition the extracted tokens as representative of specific execution states.

Figure 2A:
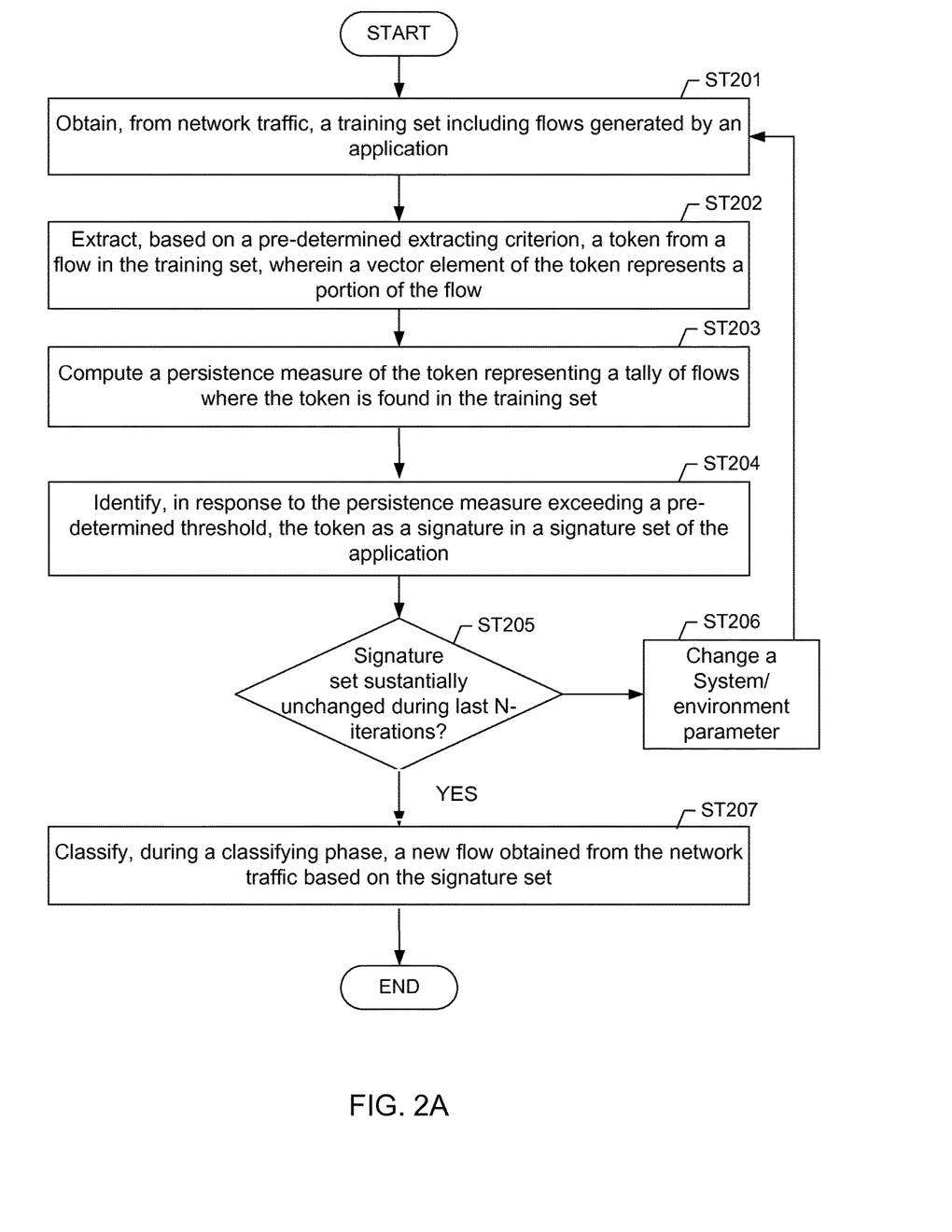
FIGS. 2A and 2B show method flow charts according to aspects of the invention.

In one or more embodiments, a flow (not shown) in the training set (130) may be processed by the token extractor (124) to extract a token, such as the token A (130a), token B (130b), etc. In one or more embodiments, a token is a vector having substrings as its elements. In one or more embodiments, a token meeting a pre-determined criterion is used as a signature in the application signature set, such as the application A signature set (132a). For example, the token A (130a), token B (130b), etc. (referred to as signatures) may be vectors of substrings that satisfy the pre-determined criterion. In one or more embodiments, the signature generator (125) is configured to generate the application A signature set (132a) using the method described in reference to FIG. 2 below.

In one or more embodiments of the invention, the network traffic classification tool (120) includes the classifier (126) that is configured to classify a new flow (e.g., flow (111)) or a new flow set (containing multiple flows) obtained from the network traffic. In one or more embodiments, a new token set (containing one or more new token(s)) is extracted from the new flow or flow set by the token extractor (124) and compared, by the classifier (126) to one or more application signature sets (e.g., application A signature set (132a)). When the new token set is determined to be sufficiently similar (e.g., based on a pre-determined criterion) to a particular application signature set, the new flow or flow set is identified as being generated by the application associated with the matching signature set. Additional details of comparing the new flow to the application signature sets are described in reference to FIG. 2 below. In another embodiment, a token set is identified as being generated by the application associated with a matching signature set only if the corresponding token set is sufficiently different from the signature sets of all other applications in the repository.

While specific components are depicted and/or described for use in the units and/or modules of the network traffic classification tool (120), it will be appreciated that a variety of components with various functions may be used to provide the formatting, processing, utility and coordination functions necessary to modify various working data used by the network traffic classification tool (120). The components may have combined functionalities and may be implemented as software, hardware, firmware, or combinations thereof.

Figure 2B:
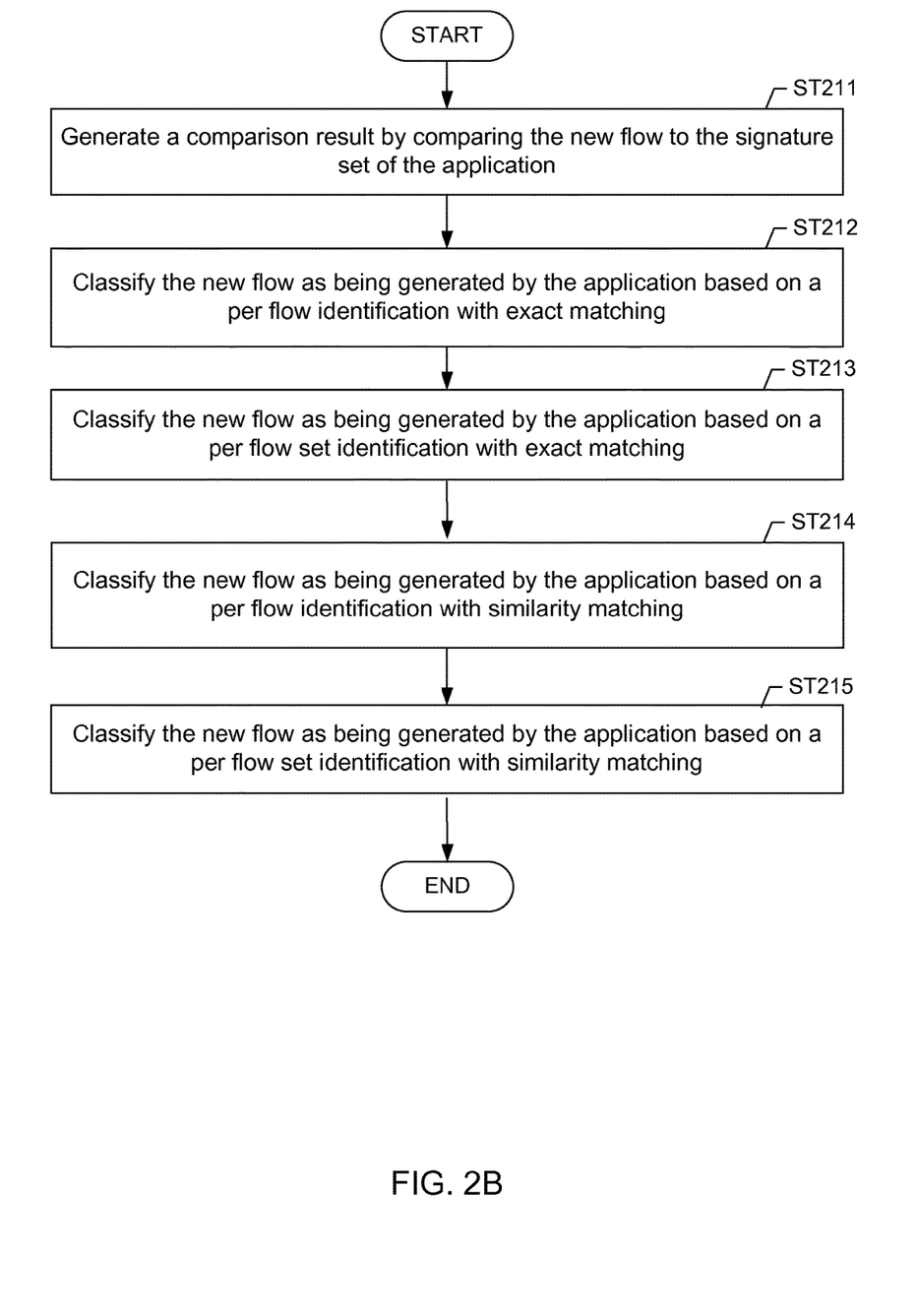

FIGS. 2A-2B depict flowcharts of methods in accordance with one or more embodiments of the invention. In one or more embodiments of the invention, one or more of the steps shown in FIGS. 2A-2B may be omitted, repeated, and/or performed in a different order. Accordingly, embodiments of the invention should not be considered limited to the specific arrangements of steps shown in FIGS. 2A-2B. In one or more embodiments of the invention, the methods depicted in FIGS. 2A-2B may be practiced using system (100) described with respect to FIG. 1 above.

Generally, the method depicted in FIG. 2A is used to classify network traffic in a network by first generating, during a training phase, a set of signatures of an application executing in the network. The method depicted in FIG. 2B is used to determine a new flow as being generated by a particular application by comparing extracted tokens of the new flow to the set of signatures of the particular application.

As shown in FIG. 2A, initially in Step 201, a collection of flows generated by an application are captured, during a training phase, to form a training set of the application. In one or more embodiments, a user application (i.e., a client portion of a network application) is identified from a pre-determined source of applications, such as Android® Market, Goggle® Play Store, Apple® App Store, etc. Accordingly, the identified application is installed on a mobile device or a mobile device emulator to be executed using an automated tester. In one or more embodiments, the automated tester is a "clicking tool" that exercises (clicks) the various buttons/icons available in the user interface of the installed application according to a test sequence (i.e., a test suite). This is for activating execution patterns of the application. In one or more embodiments, the clicking (i.e., test sequence) follows a pattern that may be random, pre-recorded, or programmed, i.e., based on policies related to the screens, icons, buttons, and menus displayed as a consequence of the clicking. In another embodiment, the clicking tool is generating events of several different types, including but not limited to clicks, that can be accepted by the application. In another embodiment, the clicking is performed manually by a human tester or in combination with the actions of a clicking tool.

In one or more embodiments, multiple training sets are formed by varying the input event sequence (e.g., clicking), the operating system running on the mobile device, the application version or other system and environmental parameter that may affect the traffic generated by the application. In another embodiment, the application is run on a client node (e.g., a device or device emulator) and the flows generated by the application are captured by data collectors locally to the client node. In another embodiment, data collectors are not collocated with the client node, but a proxy device collects the data packets generated by the application running on the client node and convey them to the data collector by means of a tunnel. For example, the tunnel may be realized by encapsulating the data packets generated by the application in data packets directed from the proxy device to at least one of the data collectors. In one or more embodiments, certain percentage of the training sets are generated without any user interface clicking so as to ensure that no user specified information can show up in any flow in the training set. For example, this prevents biasing the signature by user specified host name or other user specified substring as a result of user interface clicking.

In one or more embodiments, the flows generated in given states of the execution of the application can be singled out to partition the training set in portions associated to specific execution states to later partition the extracted tokens as representative of specific execution states. For example, the execution state of the application may be captured when a flow is captured b the data collector.

In Step 202, a token is extracted from a flow in the training set based on a pre-determined extraction criterion. In one or more embodiments, the token is a vector of multiple vector elements where each element corresponds to a portion of the flow. As is known in the art, a vector is a mathematical data item including multiple elements referred to as vector elements. For example, the flow may be represented as a string, where the vector element may be a substring extracted from the flow and the token is a vector of substrings. In one or more embodiments, each substring may be extracted based on a pre-determined query field, a pre-determined delimiter, and a pre-determined K-V pair found in HTTP traffic generated by the application. Additional details of different types of token are described in reference to FIG. 1 and an application example depicted in TABLE 1 below.

For web based applications, pre-allocated "query" field has already been standardized in Universal Resource Identifier (URI) embedded in HTTP traffic. Examples of the query fields are shown in TABLE 1 below.

TABLE 1 foo://www.example.com:8042/over/there? name=ferret#nose  
\\_/ \\______________________/\\______/ \\__________/ \\__/  
  |             |                |          |            |  
scheme      authority           path      query      fragment As shown in TABLE 1, the authority field of the URI consists of a host name (i.e., www.example.com) and an optional port number (i.e., 8042); the host name consists of a domain name (i.e., example.com) and host identifier (i.e., www) within the domain. Further, the query field contains a K-V pair (i.e., K=name, V=ferret). Accordingly, the host name, domain name, K-V pair, etc. may be used as the substring to form the token. Further, the token may be composed from a combination of one or more portions of the URI identified by defining a set of separator symbols. For example, the URI may be broken into portions separated by symbols {"&", "/", "="}. As noted above, a K-V pair is a particular case of token where each token is the combination of two portions: a host name (or domain name) and substring delimited by {"?", "#",EOL}.

TABLE 2

/ping?ap_av=2.3.4.1&ap_id=20327cb3a98e82623afdf15c5aaf863d2  
25b3ff9&ap_cr=Android&ap_ev=start&ap_la=en%5FUS&ap_pl=sdk&a  
p_prm=market&ap_pv=2.3.3&ap_tz=GMT&ap_tzg=Etc%2FUniversal&a  
p_cn=mobile&ap_v=1&h=com.aol.mobile.aim.android.application  
&dm_dpi=240&dm_h=800&dm_w=480&ts=1338440033 HTTP/1.1  
User-Agent: AOL_AIM_Android/2.3.4.1 (Android; 10; 2.3.3;  
101070; en-US)  
Content-Language: en-US  
Cache-Control: no-store,no-cache  
Accept: */*  
Accept-Encoding: gzip  
Cookie:  
MUNAUTHID=1.20327cb3a98e82623afdf15c5aaf863d225b3ff9.10a9  
Host: b.aol.com  
Connection: Keep-Alive TABLE 2 is an example of the HTTP GET message sent by the "AOL AIM" Android® application to server "b.aol-.com". A set of substrings extracted using a predefined set of separators {"&", "/", "=", " ", ":", LF, CR} includes the substrings "AOL_AIM_Android," and "b.aol.com", which are included as two vector element of a token and used as a signature of Android® application "AOL AIM".

In Step 203, a persistence measure of the token is computed to represent a tally of how many flows in the training set that each include the token. For example, if the training set includes 100 flows and the token is found in 65 flows, the tally is 65. In one or more embodiments, the persistence measure is a normalized quantity (e.g., a percentage) based on the tally, such as 65/100=65%. In one or more embodiments, the persistence measure includes a per-training set persistence measure and a cumulative persistence measure. Specifically, the per-training set persistence measure is tallied over a single training set while the cumulative persistence measure is tallied over all previously analyzed training sets for the application. In another embodiment, persistence is computed across a selected set of training sets, wherein each training set possibly corresponds to a different run of the application. For example, if the set of training sets includes flows from a 10 runs of the application and the token is found in flows in training sets from 6 different runs, the tally is 6 out of 10, or 60%.

In Step 204, the token is identified as a signature of the application in response to the persistence measure exceeding a pre-determined threshold. For example, the pre-determined threshold may be 50% and the token is thus identified as a signature of the application. In one or more embodiments, multiple tokens may have their respective persistence measure exceeding the pre-determined threshold and are included in a signature set of the application. For example, the token A (130*a*) depicted in FIG. 1 may have 65% as its persistence measure and the token B (130*b*) depicted in FIG. 1 may have 90% as its persistence measure. Said in other words, the token A (130*a*) is a vector of substrings where each substring vector element occurs in 65% of the flows in the training set (130). Similarly, the token B (130*b*) is another vector of substrings where each substring vector element occurs in 90% of the flows in the training set (130).

In one or more embodiments, for the token to be considered as occurring in a particular flow, the vector elements are required to occur in the particular flow in the specific order as they appear in the token. In one or more embodiments, for the token to be considered as occurring in a particular flow, the vector elements may occur in any order in the particular flow. In one or more embodiments, for the token to be considered as occurring in a particular flow, each of the vector elements may occur in separate one of non-consecutive sections of the particular flow. In other words, the vector elements are not required to be adjacent to each other.

In one or more embodiments, both the per-training set persistence measure and cumulative persistence measure are compared to the same percentage threshold. In one or more embodiments, the per-training set persistence measure and the cumulative persistence measure are each compared to a different percentage threshold. In other words, when determining whether the token is a signature, the per-training set persistence measure of the token is compared to a pre-determined per-training set persistence threshold and the cumulative persistence measure of the token is compared to a pre-determined cumulative persistence threshold. In one or more embodiments, a commonality measure is computed for the token representing a tally of its occurrences in the flows of other applications. In such embodiments, if the token commonality is above a given threshold, it is not included in the signature set. In other words, when the token appears in too many flows of too many other applications, it becomes less representative of any given application and is thus excluded from the signature set.

As an example, a host name, which is a simpler type of token, is identified as a signature in the following manner. Many applications use dedicated servers to fetch content. If an application connects to a server with a host name that no other application uses, then this host name can be used to identify the application. In one or more embodiments, the number of applications visiting each host name is first determined. Then for each host name that is only accessed by a single application, it is further determined whether the application visits the host name in each training set (i.e., every time it runs). Several different training sets are checked with varying system/environment conditions. Some of these runs do not involve any user interaction, which ensures that these host names will be contacted every time the application runs regardless of the circumstances.

Each host name which is only accessed by one application and which is always accessed by that application then becomes a unique host name for that application. Some applications may have multiple unique host names.

In one or more embodiments, the signature set is incrementally modified as an additional one of the multiple training sets is analyzed to update the cumulative persistence measure of each token previously identified as a signature in the signature set. Accordingly, the signature set converges into one final signature set of the application. In one or more embodiments, a method to finalize the signature set is described in reference to the iteration loop of Steps 205-Step 206-Step 201 through Step 204.

In one or more embodiments, to systematically identify applications based on K-V pairs, relevant query keys are screened to eliminate irrelevant K-V pairs, i.e., the K-V pairs providing no information about application identity. For example, irrelevant K-V pairs may be eliminated based on a pre-determined blacklist.

As noted above, K-V pairs includes following categories: web-object-dependent K-V pairs, run-dependent K-V pairs, application-dependent K-V pairs, developer-dependent K-V pairs, and platform-dependent K-V pairs. The K-V pairs that include identity information must be consistent and invariable over runs, i.e., they should always appear in different trainings and whenever K appears, its corresponding V does not change. Said in other words, a K-V pair meeting this criterion is the token. Besides application and developer dependent K-V pairs, the other K-V pairs will be statistically eliminated over multiple training sets. Eventually, given an application, after several runs, for each host domain that it accesses, a converged K-V pairs table emerges including all its identity information. In other words, the converged K-V pairs table remains unchanged even if more training sets are analyzed to generate K-V pairs and to update persistence measures. This stable K-V pairs table is the signature set of the application.

As noted above, the K-V pair is a special case token. Using the same method described above for generating the converged K-V pairs table, a finalized signature set can be generated using general case tokens as signatures in the signature set.

Specifically in Step 205, a determination is made as to whether the signature set formed in Step 204 has remained substantially unchanged during the past N-iterations. In one or more embodiments, N is a pre-determined integer, such as two, four, ten, etc. If the determination is no, the method proceeds to Step 206 where a system or an environmental parameter is changed in the aforementioned test suite before returning to Step 201 for an additional iteration. For example, the clicking sequence, the operating system running on the mobile device, the application version or other system and environmental parameter that may affect the traffic generated by the application is changed in the test suite to obtain the next training set. In one or more embodiments, "substantially unchanged" requires that no more than M signatures change in the signature set different, where M is a pre-determined integer (e.g., two, four, ten, etc.) or a pre-determined percentage (e.g., 1%, 5%, 10%, etc.)

If the determination in Step 205 is yes, the method proceeds to Step 207.

In Step 207, a new flow obtained from the network traffic is classified during a classifying phase based on the signature set of the application. In one or more embodiments, the new flow is classified as being generated by the application from a collection of applications. In one or more embodiments, the collection of applications is defined by the source of applications, such as Android© Market, Google© Play Store, iTunes© Store, etc.

In one or more embodiments, the application is a user application executing on a user device that is a network client node accessing a network server node during the execution of the user application. Example applications include The Weather Channel©, Google+©, Google© Search, Pandora©, iMovie©, iPhoto©, Keynote©, iBooks©, iTunes©, TuneIn©, iHeart©. Network protocols (e.g., a transport layer protocol or an application layer protocol) for communication between the network client node and server node may be identified to assist performing the method described above. For example, the network protocol may be a character-based protocol, such as HTTP, SMTP, POP, IMAP, SNMP, etc. known to those skilled in the art. In another example, the network protocol may be a byte-based protocol. In one or more embodiments, when classifying network traffic with respect to the application, the real time network traffic flows are first classified using layer-seven protocol signatures, such as described in the U.S. patent application Ser. No. 13/109,675, entitled "SYSTEM AND METHOD FOR USING NETWORK APPLICATION SIGNATURES BASED ON MODIFIED TERM TRANSITION STATE MACHINE," of which the entirety is incorporated herein by reference. In the incorporated U.S. patent application Ser. No. 13/109,675, the terms "application" and/or "application class" refer to a layer-seven (i.e., application-layer) protocol with a distinct documented behavior in terms of communication exchanges, control packets, etc. Examples of such application include HTTP, SMTP, MSN, BitTorrent©, Gnutella©, POP3, MSN©, EDonkey©, Telnet©, Samba©, Yahoo® IM, etc. Accordingly, the classifier discards any new flow that has a different layer-seven protocol than the application, to which the real time network traffic is to be classified. For example, if the application is known to generate HTTP flows, non-HTTP flows are discarded without being analyzed by the classifier.

As noted above, the method depicted in FIG. 2B is used to determine a new flow as being generated by a particular application by comparing extracted tokens of the new flow to the set of signatures of the particular application.

Given the network traffic generated by an application that needs to be identified (i.e., classified), the identification (i.e., classification) can be performed according to several methods. First of all the identification can be performed on single flow basis or on flow set basis. Second, identification can be based on an exact matching of tokens or on a best matching of tokens (as represented by a token similarity measure). In order to implement similarity matching, each token (i.e., signature) is assigned a weight based on how often it appears in multiple applications. For example, several applications using the doubleclick service may all have a common K-V pair such as "os=android" in their generated flows. In one or more embodiments, the weight assigned to a token (e.g., a vector containing K-V pairs) is the inverse of its cross-application popularity, i.e., occurrence frequency in different applications. In other words, if a token only occurs in flows generated by a single application, the token is assigned a high weight. Conversely, if a token occurs in one flow generated by one application and occurs in another flow generated by another application, the token is assigned a lower weight. If a token occurs in many flows each generated by a different application, the token is assigned an even lower weight.

In one or more embodiments, a combination of the per-flow versus per-flow-set identification and exact-matching versus similarity-matching identification can be used, thus resulting in four different types of criteria for application identification. Steps 212 through 215 describe flow classification using these four types of criteria. In one or more embodiments, a matched signature detected in the new flow to be classified may be presented to a user to determine whether it should be included or excluded for classifying the new flow. In other words, the user may exclude a signature of the application that is detected in the new flow from the per-flow or per-flow set identification criteria.

In one or more embodiments, one or more of these four steps may be omitted, repeated, and/or performed in a different order. For example, when classifying a new flow during the classification phase, Step 212 may be performed to determine if the new flow is generated by a particular application. If the determination is yes, the new flow is successfully classified using the per flow identification with exact matching. If the determination is no, i.e., the new flow fails to be classified based on this criterion, it is classified further in Step 213 using per flow set identification with exact matching. If the new flow still fails to be classified in Step 213, it is classified further in Step 214 using per flow identification with similarity matching. If the new flow still fails to be classified in Step 214, it is classified further in Step 215 using per flow set identification with similarity matching. If the new flow still fails to be classified in Step 215, it is then determined to be not generated by the particular application. In another example, the sequential classification may be performed using the Steps 212-215 in a reverse order. In yet another example, any single Step or a sequence of two or more of these Steps may be used.

As shown in FIG. 2B, initially in Step 211, a comparison result is generated by comparing the new flow to the signature set of the application. Accordingly, the new flow is classified as being generated by the application or not based on whether the comparison result meets a pre-determined classifying criterion.

In one or more embodiments, the comparison result is generated by comparing the new flow to a signature subset of the signature set wherein the signature subset is associated with a particular execution state of the application. Accordingly, the new flow is classified as being generated by the application when the application traverses the particular execution state or not based on whether the comparison result meets a pre-determined classifying criterion.

In Step 212, the pre-determined classifying criterion requires per-flow identification with exact matching.

In one or more embodiments, a flow is considered to have an exact matching with the signature set if it includes the entirety of at least one token (i.e., a combination of flow portions extracted during the training phase) included in the signature set. In such embodiments, classifying the new flow as being generated by the application is based on detecting from the new flow an exact match to the combination of flow portions of at least one signature in the signature set.

In one or more embodiments, a flow is considered to have an exact matching with the signature set if it includes the entirety of each token (i.e., a combination of flow portions extracted during the training phase) included in the signature set. In such embodiments, classifying the new flow as being generated by the application is based on detecting from the new flow all signatures in the signature set in their entirety. In other words, every flow portions in each signature are included in the new flow.

In Step 213, the pre-determined classifying criterion requires per-flow-set identification with exact matching. In one or more embodiments, a set of flows extracted from the traffic are considered as belonging to the application (i.e., generated from the application) if each flow in the set includes the entirety of at least one token (i.e., a combination of flow portions extracted during the training phase) included in the signature set. In such embodiments, when classifying the new flow, potentially related flows are collected from the network traffic based on a pre-determined grouping criterion to form the flow set. Accordingly, classifying the new flow as being generated by the application is based on detecting, from each flow in a minimum percentage of the flow set, at least one signature in the signature set in its entirety. In particular, if the grouping criterion used is of high confidence that most, if not all, of the collected flows are related (i.e., generated by the same application) to the new flow, the minimum percentage may be set to a high level, such as 95%, 100%, etc. Conversely, if the grouping criterion used is of medium or low confidence that the collected flows may or may not relate to the new flow, the minimum percentage may be set to a medium or lower level, such as 75%, 500%, etc.

In one or more embodiments, the pre-determined grouping criterion requires the flows in a flow set to be originated from the same IP address or the same set of IP addresses. In particular, this IP address or set of IP address is used by the particular application according an application specific criterion. In one or more embodiments, the pre-determined grouping criterion requires the flows in a flow set to be within a maximum time distance. For example, the time distance may be measured from the first flow in the flow set. In another example, the time distance may be measured between any two consecutive flows. In one or more embodiments, all the flows that are collected in sequence without any flow coming from a different source than the preceding flows are considered part of a flow set. In one or more embodiments, consecutive flows coming from the same IP address or the same set of IP addresses are considered part of the flow set until a flow is identified (e.g., using the per-flow identification described in Step 212 or Step 214) as belonging to a specific application.

In one or more embodiments, a set of flows extracted from the traffic are considered as belonging to the application (i.e., generated from the application) if each flow in the set includes the entirety of each and every token (i.e., a combination of flow portions extracted during the training phase) included in the signature set. In such embodiments, when classifying the new flow, related flows are collected from the network traffic based on a pre-determined grouping criterion to form the flow set. Accordingly, classifying the new flow as being generated by the application is based on detecting, from each flow in a minimum percentage of the flow set, each and every signature in the signature set in its entirety. As described above, the minimum percentage may be set according to a confidence level of whether the grouping criterion used is capable of collecting flows that are truly related (i.e., generated by the same application) to the new flow.

In one or more embodiments, the per-flow-set identification with exact matching may require not only exact matching, but also that matching flows appear in the same order in which they were identified as a signature set from the training set.

In Step 214, the pre-determined classifying criterion requires per-flow identification with similarity matching. Using this criterion, a flow is considered as belonging to the application if a similarity score between the flow and the signature set of the application is highest across a set of applications from a single application source. As noted above, the application source may be one from Android® Market, Google® Play Store, iTunes® Store, etc. Example applications from these application sources may include The Weather Channel©, Google+©, Google® Search, Pandora©, iMovie©, iPhoto©, Keynote©, iBooks©, iTunes©, TuneIn©, iHeart©. In other words, when classifying the new flow using this criterion, multiple comparison results are generated by comparing the new flow to multiple signature sets of multiple applications from the application source. Accordingly, classifying the new flow as being generated by the application is based on determining, from the multiple comparison results, that the new flow is most similar to the signature set of the application compared to any other signature set across the set of applications.

As noted above, a signature is a token, which itself is a vector having vector element(s). The vector element is a portion of a flow extracted during the training phase. In one or more embodiments, the similarity score is determined based on pre-assigning a weight (i.e., weighting factor) to a vector element of a token in the signature set. In one or more embodiments, the weight is inversely proportional to a probability of the vector element occurring in multiple flows generated by different applications in the set of applications. In other words, if the vector element is unique to a single application, it is assigned a high weight. Conversely, if the vector element may occur in flows generated from many different applications, it is assigned a lower weight. In one or more embodiments, the similarity matching does not require that a token in the signature set of the application occurs in its entirety in the new flow. Instead, if one or more vector element of the token occurs in the new flow, a similarity score is computed based on the pre-assigned weights to these vector element(s). In one or more embodiments, the similarity score of the new flow, as compared to the signature set of the application, is a sum of the weights of all vector elements (i.e., partial tokens) form the signature set that occur in the new flow. Accordingly, determining that the new flow is most similar to the signature set of the application across the set of applications is based on the similarity score being highest among all similarity scores of the new flow as compared across the set of applications.

In Step 215, the pre-determined classifying criterion requires per-flow-set identification with similarity matching. Using this criterion, a flow is considered as belonging to the application if a similarity score between a related flow set of the flow and the signature set of the application is highest across a set of applications from a single application source. In one or more embodiments, when classifying the new flow using this criterion, related flows are collected from the network traffic based on a pre-determined grouping criterion to form the flow set. In such embodiments, classifying the new flow as being generated by the application is based on multiple comparison results that are generated by comparing the flow set to multiple signature sets of multiple applications from the application source. Accordingly, classifying the new flow as being generated by the application is based on determining, from the multiple comparison results, that the flow set is most similar to the signature set of the application compared to any other signature set across the set of applications.

In one or more embodiments, the similarity matching does not require that a token in the signature set of the application occurs in its entirety in the a flow of the flow set. Instead, if one or more vector element of the token occurs in any flow in the flow set, a similarity score is computed based on the pre-assigned weights to these vector element(s). In one or more embodiments, the similarity score of the flow set, as compared to the signature set of the application, is a sum of the weights of all vector elements (i.e., partial tokens) form the signature set that occur in the flow set. In one or more embodiments, the sum of the weights is normalized based on the size of the flow set to generate a normalized flow set as the similarity score. Accordingly, determining that the flow set is most similar to the signature set of the application across the set of applications is based on the similarity score being highest among all similarity scores of the flow set as compared across the set of applications.

An example of classifying flows using host names (i.e., a special type of token) as signatures is described below. To identify an application using this technique, the host name in an HTTP GET or POST request in the flows is checked to determine if it matches one of the host names from the signature set. If so then the application can be identified corresponding to the matching host name. In another example, the domain name can be used as a signature instead of a full host name.

As noted above, flow classification with respect to applications can be performed separately for each single flow, or based on a per-flow-set basis. For example, a set of flows is considered as generated by a given application if all the flows are directed to a host name (domain) contained in the ground truth for that application. In another example, a set of flows is considered as generated by a given application if a minimum percentage of the flows are directed to a host name (domain) contained in the ground truth for that application. In yet another example, host name (domain) matching is based on similarity (e.g., by pre-assigning weighs to the sub-domain names) rather than exact matching.

In a possible embodiment, the host name (domain) contacted is extracted from the HTTP header while in another possible embodiment it is extracted from the DNS query preceding a flow (e.g., an HTTP flow) to find out the host name used as the destination in the flow.

Although specific formats, structures, or partitions are used as examples in the foregoing description regarding the various components in the network traffic classification tool, user system, and computer network, one skilled in the art, with the benefit of this disclosure, would recognize that other formats or structures may also be used in the system, methods, and examples described without deviating from the spirit of the invention.

Figure 3:
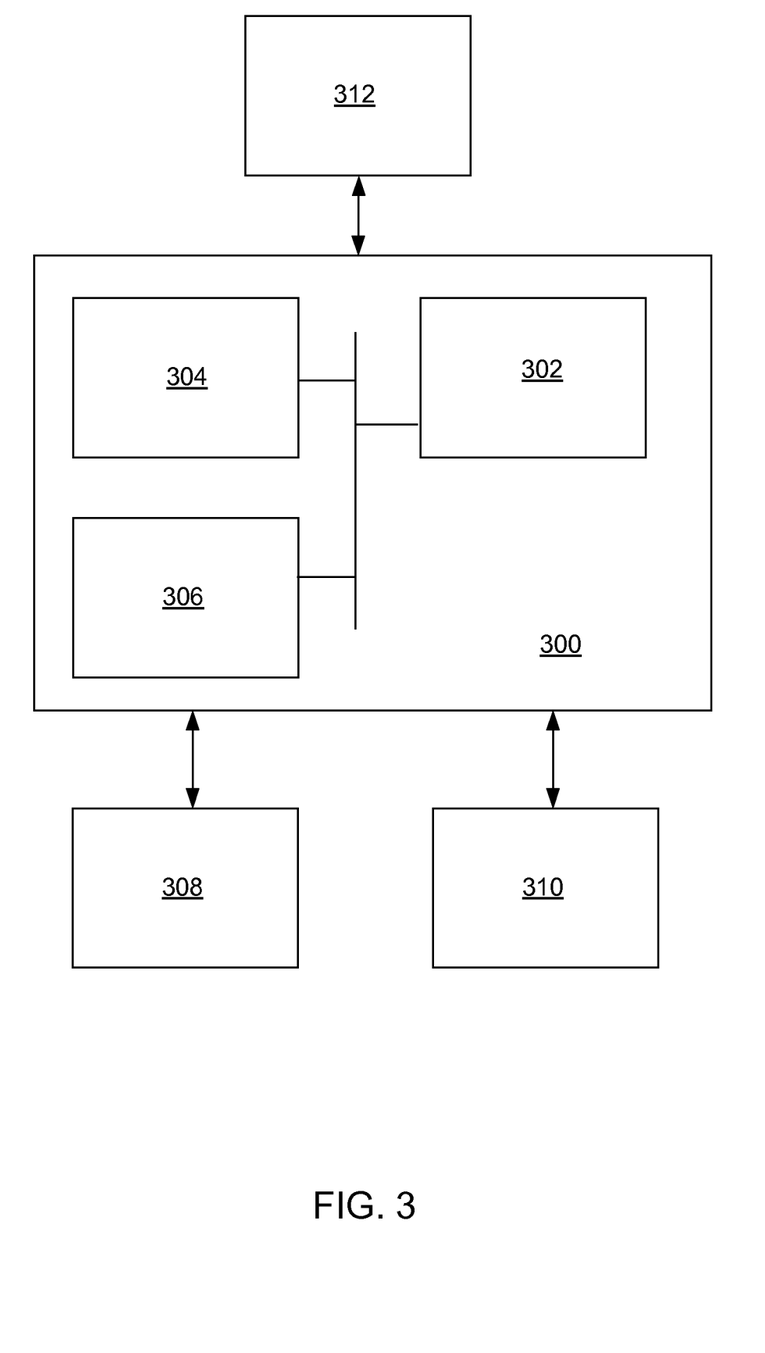
FIG. 3 shows a computer system according to aspects of the invention.

Embodiments of the invention may be implemented on virtually any type of computer regardless of the platform being used. For example, as shown in FIG. 3, a computer system (300) includes one or more processor(s) (302) (e.g., central processing unit or CPU), associated memory (304) (e.g., random document access memory (RAM), cache memory, flash memory, etc.), a storage device (306) (e.g., a hard disk, an optical drive such as a compact disk drive or digital video disk (DVD) drive, a flash memory stick, etc.), and numerous other elements and functionalities typical of today's computers (not shown). The computer (300) may also include input means, such as a keyboard (308), a mouse (310), or a microphone (not shown). Further, the computer (300) may include output means, such as a monitor (312) (e.g., a liquid crystal display (LCD), a plasma display, or cathode ray tube (CRT) monitor) for example to display various results such as the tokens, the principal components, the application space, the signatures, etc. The computer system (300) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (300) includes at least the minimal processing, input, and/or output means necessary to practice embodiments of the invention.

Further, those skilled in the art will appreciate that one or more elements of the aforementioned computer system (300) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for classifying network traffic in a network, comprising:
generating, by a processor of a computer system during a training phase, a signature set of an application executing in the network, comprising:
installing the application on a device, wherein the application is a user application for user download configured such that a user can choose to download the user application amongst a plurality of user applications provided by a predetermined source of user applications;
executing the application on the device using an automated tester, wherein executing the application includes auto-clicking various buttons or icons available in a user interface of the application, wherein when the user application is executed on the device, the user application is a client node of a network application accessing a network server node during execution of the user application, wherein the auto-clicking activates a plurality of execution patterns of the application corresponding to a plurality of different execution states of the application;
obtaining, from the network traffic, a training set comprising a plurality of flows generated by the application, the plurality of flows including flows generated during different execution states of the application, the training set being a part of multiple training sets formed by varying input sequences, operating systems running on the device, and versions of the application, wherein the plurality of training sets are obtained via a proxy device collecting the data packets generated by the application and conveying them to a data collector by means of a tunnel, the tunnel being realized via encapsulating the data packets generated by the application in data packets directed from the proxy device to the data collector, wherein a portion of the training set is generated without any user interface clicking to ensure that no user specified information can show up in any flow in the training set;

extracting, based on a pre-determined extraction criterion, a token from a flow of the plurality of flows, the token being a vector containing vector elements, wherein a vector element of the token is a substring of a URI in a portion of the flow;

computing a persistence measure of the token to represent a tally of how many flows in the training set include the token, wherein the persistence measure is a normalized quantity based on the tally, wherein the persistence measure represents how much each vector substring element appears in flows of the training set; and identifying, in response to the persistence measure exceeding a pre-determined threshold, the token as a signature of the application, wherein the signature is included in a plurality of signatures forming the signature set of the application, wherein the token is identified as a signature only if the token is different from the signatures of all other applications in the plurality of user applications provided by the predetermined source; and classifying, by the processor during a classifying phase, a new flow obtained from the network traffic based on the signature set, comprising:

generating a comparison result by comparing the new flow to the signature set of the application; and classifying, in response to the comparison result meeting a pre-determined classifying criterion, the new flow as being generated by the application.

2. The method of claim 1, further comprising:
extracting the portion of the flow based on at least one selected from a group consisting of a header field, a pre-determined query field, a pre-determined delimiter, and a pre-determined K-V pair in the network traffic generated by the application based on at least one selected from a group consisting of a character-based protocol and a byte-based protocol, wherein the flow is represented as a string,
wherein the vector element comprises a substring, and
wherein the token comprises a vector of substrings.

3. The method of claim 1,
wherein the network traffic is generated by the application based on HTTP protocol.

4. The method of claim 1, further comprising:
executing, using a testing device configured as a client node in the network, the application according to a test sequence to generate the training set,
executing, using the testing device, the application according to another test sequence to generate another training set; and
extracting another token from the another training set for including in the signature set of the application,
wherein at least one selected from a group consisting of a user interface clicking sequence, an input event to the application, an operating system running on the testing device, a version of the application is different in the test sequence from the another test sequence.

5. The method of claim 1, further comprising:
detect, from the new flow, at least one signature in the signature set; and receive, in response to presenting the at least one signature to a user, a user input to exclude the at least one signature for classifying the new flow as being generated by the application.

6. The method of claim 1, further comprising:
detecting, from the new flow, at least one signature in the signature set,
wherein classifying the new flow as being generated by the application is based on at least the detecting.

7. The method of claim 1, further comprising:
detecting, from the new flow, all signatures of the signature set,
wherein classifying the new flow as being generated by the application is based on at least the detecting.

8. The method of claim 1, further comprising:
obtaining, during the classifying phase based on a pre-determined grouping criterion, a plurality of new flows from the network traffic to form a flow set, wherein the flow set comprises the new flow; and
detecting, from at least one flow in the flow set, at least one signature in the signature set,
wherein classifying the new flow as being generated by the application is based on at least the detecting.

9. The method of claim 1, further comprising:
obtaining, during the classifying phase based on a pre-determined grouping criterion, a plurality of new flows from the network traffic to form a flow set, wherein the flow set comprises the new flow; and
detecting, from at least one flow in the flow set, all signatures in the signature set,
wherein classifying the new flow as being generated by the application is based on at least the detecting.

10. The method of claim 1, further comprising:
generating a plurality of comparison results by comparing the new flow to a plurality of signature sets of a plurality of applications, wherein the plurality of comparison results comprise the comparison result, wherein the plurality of signature sets comprise the signature set, and wherein the plurality of applications comprise the application; and
determining, based on the plurality of comparison results, that the new flow is most similar to the signature set of the application compared to any other signature set in the plurality of signature sets,
wherein classifying the new flow as being generated by the application is based on at least the determining.

11. The method of claim 10, further comprising:
assigning a weight to the vector element, wherein the weight is inversely proportional to a probability of the vector element occurring in flows generated by different applications in the plurality of applications;
detecting the vector element occurring in the new flow; and
computing, in response to the detecting and based at least on the weight, a similarity score of the new flow to the application,
wherein determining that the new flow is most similar to the signature set of the application is based at least on the similarity score.

12. The method of claim 1, further comprising:
obtaining, during the classifying phase based on a pre-determined grouping criterion, a plurality of new flows from the network traffic to form a flow set, wherein the flow set comprises the new flow;
generating a plurality of comparison results by comparing the flow set to a plurality of signature sets of a plurality of applications, wherein the plurality of comparison results comprise the comparison result, wherein the plurality of signature sets comprise the signature set, and wherein the plurality of applications comprise the application; and determining, based on the plurality of comparison results, that the flow set is most similar to the signature set of the application compared to any other signature set in the plurality of signature sets, wherein classifying the new flow as being generated by the application is based on at least the determining.

13. The method of claim 12, further comprising:

assigning a weight to the vector element, wherein the weight is inversely proportional to a probability of the vector element occurring in flows generated by different applications in the plurality of applications;

detecting the vector element occurring in the new flow; and computing, in response to the detecting and based at least on the weight, a similarity score of the new flow set to the application, wherein determining that the new flow set is most similar to the signature set of the application is based at least on the similarity score.

14. The method of claim 1, wherein generating the comparison result comprises comparing the new flow to a subset of the signature set of the application, wherein the subset is associated with an execution state of the application, and wherein classifying the new flow comprised determining the new flow as being generated by the application when the application traverses the execution state.

15. A system for classifying network traffic in a network, comprising:

a hardware processor configured to install and execute an application on a device, wherein the application is a user application for user download configured such that a user can choose to download the user application amongst a plurality of user applications provided by a predetermined source of user applications, a user interface configured to display various buttons or icons of the application;

an automated tester configured to auto-click the various buttons or icons displayed in the user interface during execution of the application, wherein when the user application is executed on the device, the user application is a client node of a network application accessing a network server node during execution of the user application, wherein the auto-clicking activates a plurality of execution patterns of the application corresponding to a plurality of different execution states of the application;

an acquisition module executing on the hardware processor and configured to obtain, during a training phase from the network traffic, a training set comprising a plurality of flows generated by the application, the plurality of flows including flows generated during different execution states of the application, the training set being a part of multiple training sets formed by varying input sequences, operating systems running on the device, and versions of the application, wherein the plurality of training sets are obtained via a proxy device collecting the data packets generated by the application and conveying them to a data collector by means of a tunnel, the tunnel being realized via encapsulating the data packets generated by the application in data packets directed from the proxy device to the data collector, wherein a portion of the training set is generated without any user interface clicking to ensure that no user specified information can show up in any flow in the training set:

a token extractor executing on the hardware processor and configured to extract, during the training phase and based on a pre-determined extraction criterion, a token from a flow of the plurality of flows, the token being a vector containing vector elements, wherein a vector element of the token is a substring of a URI in a portion of the flow;

a signature generator executing on the hardware processor and configured to generate, during the training phase, a plurality of signatures of an application executing in the network by:

computing a persistence measure of the token to represent a tally of how many flows in the training set include the token, wherein the persistence measure is a normalized quantity based on the tally, wherein the persistence measure represents how much each vector substring element appears in flows of the training set; and identifying, in response to the persistence measure exceeding a pre-determined threshold, the token as a signature of the application, wherein the signature is included in a plurality of signatures forming the signature set of the application, wherein the token is identified as a signature only if the token is different from the signatures of all other applications in the plurality of user applications provided by the predetermined source; and a classifier executing on the hardware processor and configured to classify, during a classifying phase, a new flow obtained from the network traffic based on the signature set by generating a comparison result by comparing the new flow to the signature set of the application; and classifying, in response to the comparison result meeting a pre-determined classifying criterion, the new flow as being generated by the application.

16. The system of claim 15, wherein the token extractor is configured to extract the token by:

extracting the portion of the flow based on at least one selected from a group consisting of a header field, a pre-determined query field, a pre-determined delimiter, and a pre-determined K-V pair found in the network traffic generated by the application based on at least one selected from a group consisting of a character-based protocol and a byte-based protocol, wherein the flow is represented as a string, wherein the vector element comprises a substring, and wherein the token comprises a vector of substrings.

17. The system of claim 16, wherein the network traffic is generated by the application based on HTTP protocol.

18. The system of claim 15, further comprises a testing device configured as a client node in the network and configured to:

execute the application according to a test sequence to generate the plurality of flows that are obtained by the acquisition module as the training set; and execute the application according to another test sequence to generate another training set, wherein the token extractor is further configured to extract another token from the another training set for including in the signature set of the application,
wherein at least one selected from a group consisting of a user interface clicking sequence, an input event to the application, an operating system running on the testing device, a version of the application is different in the test sequence from the another test sequence.

19. The system of claim 15, the classifier further configured to:
detect, from the new flow, at least one signature in the signature set; and
receive, in response to presenting the at least one signature to a user, a user input to exclude the at least one signature for classifying the new flow as being generated by the application.

20. The system of claim 15, the classifier further configured to:
detect, from the new flow, at least one signature in the signature set,
wherein classifying the new flow as being generated by the application is based on at least the detecting.

21. The system of claim 15, the classifier further configured to:
detect, from the new flow, all signatures of the signature set,
wherein classifying the new flow as being generated by the application is based on at least the detecting.

22. The system of claim 15, the classifier further configured to:
obtain, during the classifying phase based on a pre-determined grouping criterion, a plurality of new flows from the network traffic to form a flow set, wherein the flow set comprises the new flow; and
detect, from at least one flow in the flow set, at least one signature in the signature set,
wherein classifying the new flow as being generated by the application is based on at least the detecting.

23. The system of claim 15, the classifier further configured to:
obtain, during the classifying phase based on a pre-determined grouping criterion, a plurality of new flows from the network traffic to form a flow set, wherein the flow set comprises the new flow; and
detect, from at least one flow in the flow set, all signatures in the signature set,
wherein classifying the new flow as being generated by the application is based on at least the detecting.

24. The system of claim 15, the classifier further configured to:
generate a plurality of comparison results by comparing the new flow to a plurality of signature sets of a plurality of applications, wherein the plurality of comparison results comprise the comparison result, wherein the plurality of signature sets comprise the signature set, and wherein the plurality of applications comprise the application; and
determine, based on the plurality of comparison results, that the new flow is most similar to the signature set of the application compared to any other signature set in the plurality of signature sets,
wherein classifying the new flow as being generated by the application is based on at least the determining.

25. The system of claim 24, the classifier further configured to:
assign a weight to the vector element, wherein the weight is inversely proportional to a probability of the vector element occurring in multiple flows generated by different applications in the plurality of applications;
detect the vector element occurring in the new flow; and
compute, in response to the detecting and based at least on the weight, a similarity score of the new flow to the application,
wherein determining that the new flow is most similar to the signature set of the application is based at least on the similarity score.

26. The system of claim 15, the classifier further configured to:
obtain, during the classifying phase based on a pre-determined grouping criterion, a plurality of new flows from the network traffic to form a flow set, wherein the flow set comprises the new flow;
generate a plurality of comparison results by comparing the flow set to a plurality of signature sets of a plurality of applications, wherein the plurality of comparison results comprise the comparison result, wherein the plurality of signature sets comprise the signature set, and wherein the plurality of applications comprise the application; and
determine, based on the plurality of comparison results, that the flow set is most similar to the signature set of the application compared to any other signature set in the plurality of signature sets,
wherein classifying the new flow as being generated by the application is based on at least the determining.

27. The system of claim 26, the classifier further configured to:
assign a weight to the vector element, wherein the weight is inversely proportional to a probability of the vector element occurring in multiple flows generated by different applications in the plurality of applications;
detect the vector element occurring in the new flow; and
compute, in response to the detecting and based at least on the weight, a similarity score of the new flow set to the application,
wherein determining that the new flow set is most similar to the signature set of the application is based at least on the similarity score.

28. The system of claim 15,
wherein generating the comparison result comprises comparing the new flow to a subset of the signature set of the application, wherein the subset is associated with an execution state of the application, and
wherein classifying the new flow comprised determining the new flow as being generated by the application when the application traverses the execution state.

29. A non-transitory computer readable medium storing instructions for classifying network traffic in a network, the instructions, when executed by a processor of a computer, comprising functionality for:
generating, by a processor of a computer system during a training phase, a signature set of an application executing in the network, comprising:
installing the application on a device, wherein the application is a user application for user download configured such that a user can choose to download the user application amongst a plurality of user applications provided by a predetermined source of user applications;
executing the application on the device using an automated tester, wherein executing the application includes auto-clicking various buttons or icons available in a user interface of the application, wherein when the user application is executed on the device, the user application is a client node of a network application accessing a network server node during execution of the user application, wherein the auto-clicking activates a plurality of execution patterns of the application corresponding to a plurality of different execution states of the application;

obtaining, from the network traffic, a training set comprising a plurality of flows generated by the application, the plurality of flows including flows generated during different execution states of the application, the training set being a part of multiple training sets formed by varying input sequences, operating systems running on the device, and versions of the application, wherein the plurality of training sets are obtained via a proxy device collecting the data packets generated by the application and conveying them to a data collector by means of a tunnel, the tunnel being realized via encapsulating the data packets generated by the application in data packets directed from the proxy device to the data collector, wherein a portion of the training set is generated without any user interface clicking to ensure that no user specified information can show up in any flow in the training set;

extracting, based on a pre-determined extraction criterion, a token from a flow of the plurality of flows, the token being a vector containing vector elements, wherein a vector element of the token is a substring of a URI in a portion of the flow;

computing a persistence measure of the token to represent a tally of how many flows in the training set include the token, wherein the persistence measure is a normalized quantity based on the tally, wherein the persistence measure represents how much each vector substring element appears in flows of the training set; and identifying, in response to the persistence measure exceeding a pre-determined threshold, the token as a signature of the application, wherein the signature is included in a plurality of signatures forming the signature set of the application, wherein the token is identified as a signature only if the token is different from the signatures of all other applications in the plurality of user applications provided by the predetermined source; and classifying, by the processor during a classifying phase, a new flow obtained from the network traffic based on the signature set, comprising:

generating a comparison result by comparing the new flow to the signature set of the application; and classifying, in response to the comparison result meeting a pre-determined classifying criterion, the new flow as being generated by the application.

30. The non-transitory computer readable medium of claim 29, the instructions, when executed by the processor of the computer further comprising functionality for:

extracting the portion of the flow based on at least one selected from a group consisting of a header field, a pre-determined query field, a pre-determined delimiter, and a pre-determined K-V pair found in the network traffic generated by the application based on at least one selected from a group consisting of a character-based protocol and a byte-based protocol, wherein the flow is represented as a string,
wherein the vector element comprises a substring, and
wherein the token comprises a vector of substrings.

31. The non-transitory computer readable medium of claim 29, wherein the network traffic is generated by the application based on HTTP protocol.

32. The non-transitory computer readable medium of claim 29, the instructions, when executed by the processor of the computer further comprising functionality for:

executing, using a testing device configured as a client node in the network, the application according to a test sequence to generate the training set;

executing, using the testing device, the application according to another test sequence to generate another training set; and extracting another token from the another training set for including in the signature set of the application, wherein at least one selected from a group consisting of a user interface clicking sequence, an input event to the application, an operating system running on the testing device, a version of the application is different in the test sequence from the another test sequence.

33. The non-transitory computer readable medium of claim 29, the instructions, when executed by the processor of the computer further comprising functionality for:

detecting, from the new flow, at least one signature in the signature set; and receiving, in response to presenting the at least one signature to a user, a user input to exclude the at least one signature for classifying the new flow as being generated by the application.

34. The non-transitory computer readable medium of claim 29, the instructions, when executed by the processor of the computer further comprising functionality for:

detecting, from the new flow, at least one signature in the signature set, wherein classifying the new flow as being generated by the application is based on at least the detecting.

35. The non-transitory computer readable medium of claim 29, the instructions, when executed by the processor of the computer further comprising functionality for:

detecting, from the new flow, all signatures of the signature set, wherein classifying the new flow as being generated by the application is based on at least the detecting.

36. The non-transitory computer readable medium of claim 29, the instructions, when executed by the processor of the computer further comprising functionality for:

obtaining, during the classifying phase based on a pre-determined grouping criterion, a plurality of new flows from the network traffic to form a flow set, wherein the flow set comprises the new flow; and detecting, from at least one flow in the flow set, at least one signature in the signature set, wherein classifying the new flow as being generated by the application is based on at least the detecting.

37. The non-transitory computer readable medium of claim 29, the instructions, when executed by the processor of the computer further comprising functionality for:

obtaining, during the classifying phase based on a pre-determined grouping criterion, a plurality of new flows from the network traffic to form a flow set, wherein the flow set comprises the new flow; and detecting, from at least one flow in the flow set, all signatures in the signature set, wherein classifying the new flow as being generated by the application is based on at least the detecting.

38. The non-transitory computer readable medium of claim 29, the instructions, when executed by the processor of the computer further comprising functionality for:

generating a plurality of comparison results by comparing the new flow to a plurality of signature sets of a plurality of applications, wherein the plurality of comparison results comprise the comparison result, wherein the plurality of signature sets comprise the signature set, and wherein the plurality of applications comprise the application; and determining, based on the plurality of comparison results, that the new flow is most similar to the signature set of the application compared to any other signature set in the plurality of signature sets, wherein classifying the new flow as being generated by the application is based on at least the determining.

39. The non-transitory computer readable medium of claim 38, the instructions, when executed by the processor of the computer further comprising functionality for:

assigning a weight to the vector element, wherein the weight is inversely proportional to a probability of the vector element occurring in multiple flows generated by different applications in the plurality of applications;

detecting the vector element occurring in the new flow; and computing, in response to the detecting and based at least on the weight, a similarity score of the new flow to the application, wherein determining that the new flow is most similar to the signature set of the application is based at least on the similarity score.

40. The non-transitory computer readable medium of claim 29, the instructions, when executed by the processor of the computer further comprising functionality for:

obtaining, during the classifying phase based on a pre-determined grouping criterion, a plurality of new flows from the network traffic to form a flow set, wherein the flow set comprises the new flow;

generating a plurality of comparison results by comparing the flow set to a plurality of signature sets of a plurality of applications, wherein the plurality of comparison results comprise the comparison result, wherein the plurality of signature sets comprise the signature set, and wherein the plurality of applications comprise the application; and determining, based on the plurality of comparison results, that the flow set is most similar to the signature set of the application compared to any other signature set in the plurality of signature sets, wherein classifying the new flow as being generated by the application is based on at least the determining.

41. The non-transitory computer readable medium of claim 40, the instructions, when executed by the processor of the computer further comprising functionality for:

assigning a weight to the vector element, wherein the weight is inversely proportional to a probability of the vector element occurring in multiple flows generated by different applications in the plurality of applications;

detecting the vector element occurring in the new flow; and computing, in response to the detecting and based at least on the weight, a similarity score of the new flow set to the application, wherein determining that the new flow set is most similar to the signature set of the application is based at least on the similarity score.

42. The non-transitory computer readable medium of claim 29, wherein generating the comparison result comprises comparing the new flow to a subset of the signature set of the application, wherein the subset is associated with an execution state of the application, and wherein classifying the new flow comprised determining the new flow as being generated by the application when the application traverses the execution state.

\* \* \* \* \*